(12) United States Patent
Cox et al.

(10) Patent No.: US 9,369,566 B2
(45) Date of Patent: Jun. 14, 2016

(54) PROVIDING VISUAL CUES FOR A USER INTERACTING WITH AN AUTOMATED TELEPHONE SYSTEM

(71) Applicant: International Business Machines Corporation, Armonk, NY (US)

(72) Inventors: Susan M. Cox, Rochester, MN (US); Janani Janakiraman, Austin, TX (US); Fang Lu, Billerica, MA (US); Karthik Ramamoorthy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 58 days.

(21) Appl. No.: 14/318,473

(22) Filed: Jun. 27, 2014

(65) Prior Publication Data

US 2015/0381796 A1 Dec. 31, 2015

(51) Int. Cl.
*H04W 4/16* (2009.01)
*H04M 1/725* (2006.01)
*H04M 3/493* (2006.01)

(52) U.S. Cl.
CPC ........ *H04M 1/72569* (2013.01); *H04M 1/7258* (2013.01); *H04M 3/4936* (2013.01); *H04W 4/16* (2013.01)

(58) Field of Classification Search
CPC ............ H04W 4/02; H04W 4/12; H04W 8/18
USPC ...................... 455/412.1, 414.1, 414.2, 414.4
See application file for complete search history.

(56) References Cited

U.S. PATENT DOCUMENTS

| 8,223,931 | B1 | 7/2012 | Lavian et al. | |
| 8,457,288 | B2 | 6/2013 | Tischer et al. | |
| 8,582,727 | B2 | 11/2013 | Saylor et al. | |
| 2015/0074189 | A1* | 3/2015 | Cox | H04L 12/1822 709/204 |

\* cited by examiner

*Primary Examiner* — Sam Bhattacharya
(74) *Attorney, Agent, or Firm* — Marcia L. Doubet

(57) ABSTRACT

Visual cues are provided for a user who is using a telephone for interacting with an automated telephone system. A number stream is created from the digits entered by the user with the phone keypad in response to audible prompts from the automated system. The visual cues comprise graphical representations (such as icons) that are inserted into the number stream to provide a quick visual indication not only of where the entered digits are delimited, but also what they represent. Thus, the user can quickly review the visual cues—for example, while making subsequent decisions for the interaction. The visual cues are selected by locating keywords in the audible prompts and consulting a mapping data structure that identifies the visual cues to be used with particular keywords. Optionally, a textual summary of the interaction is created as well (e.g., when the interaction concludes).

20 Claims, 10 Drawing Sheets

| | keyword /410 | icon /420 | sensitive /430 | mask /440 |
|---|---|---|---|---|
| 401 | date of birth | birth.bmp | no | |
| 402 | birth date | birth.bmp | no | |
| 403 | birthday | birth.bmp | no | |
| 404 | phone number | phone.bmp | no | |
| 405 | prescription number | Rx.bmp | yes | #xxx |
| 406 | refill information | Rx_info.bmp | no | |
| 407 | refill now | Rx_cmd.bmp | no | |
| 408 | shipping date | ship.bmp | no | |

PROVIDING VISUAL CUES FOR A USER INTERACTING WITH AN AUTOMATED TELEPHONE SYSTEM

BACKGROUND OF THE INVENTION

The present invention relates to telephones and computer programming, and deals more particularly with adapting a telephone to provide visual cues for a user who is using that telephone to interact with an automated telephone system.

Use of telephones—and particularly mobile phones—for an increasing number of purposes is becoming common in today's world, and many people use their phones to perform a number of daily activities. For example, a user might use his or her phone to call a pharmacy to refill a prescription, to dial into a conference call at work, and/or to get stock updates from a stock broker. Furthermore, the user might use his or her phone to perform multiple transactions relating to multiple items while at the same time participating in a phone call with that phone.

BRIEF SUMMARY OF THE INVENTION

The present invention is directed to providing visual cues for a user interacting with an automated telephone system, and to telephones that are adapted in this manner. In one embodiment, a telephone device comprises a keypad usable for receiving responses from a user during a telephone-based interaction between the telephone device and an automated telephone system; a display area usable for displaying a data stream comprising a representation of the responses received from the user; a processor; and instructions which are executable, using the processor, to perform functions. In this embodiment, the functions comprise: detecting receipt, at the telephone device, of an audible prompt message from the automated telephone system during the telephone-based interaction; locating, in the audible prompt message, at least one keyword; using the located at least one keyword to obtain an identification of a graphical image corresponding to the located at least one keyword; inserting the identified graphical image into the data stream displayed on the display area, in advance of receiving a response from the user to the audible prompt message, as a visual cue for the user; receiving, from the user through the keypad, the response to the audible prompt message; and displaying, in the data stream on the display area, the representation of the response received from the user. Optional features include generating and displaying, on the display area, a textual summary representing the interaction.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 illustrates a user's phone display area when using a conventional approach for interacting with an automated phone system, while

FIG. 4 provides an example of a mapping data structure that identifies tooltips that correspond to particular keywords that may appear in audible prompt messages received from an automated phone system;

DETAILED DESCRIPTION OF THE INVENTION

Figure 1:
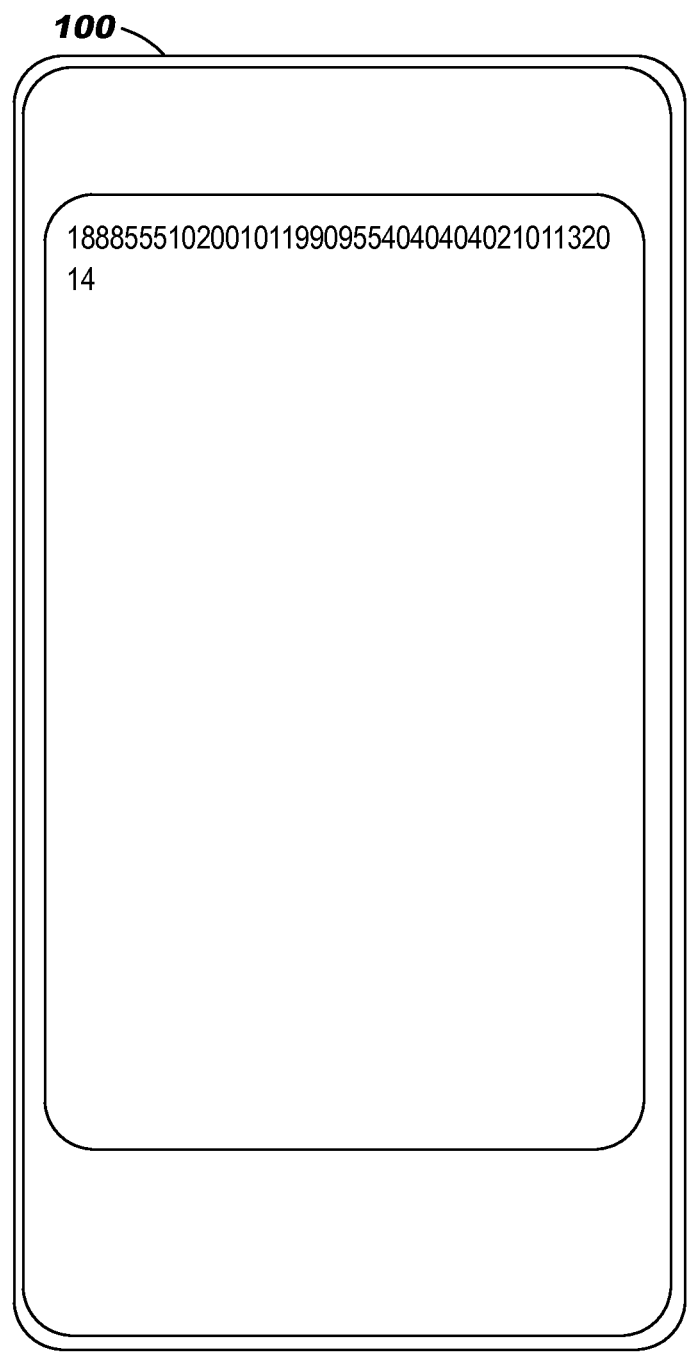

Embodiments of the present invention are directed toward providing visual cues for a user interacting with an automated telephone system, and to telephones that are adapted in this manner. Use of a phone which is adapted according to embodiment of the present invention may provide improved usability and improved user satisfaction, among other benefits, as will be described.

Many people are familiar with interactive voice response ("IVR") technology, whereby an automated phone system issues audible prompt messages to a user who has a touchtone phone, and receives responses from the user's phone by dual-tone multifrequency ("DTMF") tones. With reference to the above-described scenario where a user gets stock updates, an automated brokerage system with IVR technology may be adapted for requesting user log-in information, prompting the user to input a stock ticker symbol, and using this information to look up a current stock price that is then provided to the user through the user's phone as an audible message. The automated brokerage system might also allow the user to place stock trade orders, and to perform various other types of interactions. A business advantage of this type of system is that many interactions formerly handled by a customer support agent can now be handled by the automated phone system.

In some instances, the user's phone-based interactions with an automated phone system can be complex and/or lengthy. A number of decisions may be needed as the user performs the phone-based interaction, and making these decisions takes some amount of time. With reference to the above-described scenario where a user calls a pharmacy to refill a prescription, for example, the user might have multiple accounts to deal with, such as additional prescriptions for aging parents, a spouse, and/or children. As the user is thinking about refilling a prescription, a number of different types of data are needed at the various steps in this interaction. At some point in time, the user may have been asked a considerable number of questions through automated audible prompt messages, and the display area of the user's phone may therefore be littered with dozens of digits for the user's corresponding responses—such as the initially-dialed phone number, a digit representing the user's "I want to refill a prescription" selection from the first level of a hierarchical menu in the IVR system, digits of the prescription number, the user's birth date entered for confirmation purposes, the number of refills requested, digits relating to a payment method, and so forth. However, known approaches for phone-based interactions lack adequate visual feedback, and thus there is little to no guidance for a user who becomes confused about what data he or she has provided in response to which prompts from the automated phone system. (Note that the user's phone display when using known approaches contains a string of digits representing the user's responses to the audible prompts, but does not provide a representation of the corresponding questions. See FIG. 1, which is discussed below.)

Many automated phone systems are configured to check the user's input in real time, so that any data input errors can be dealt with immediately. If an audible prompt message from the pharmacy system requests the user to enter the user's birth date, for example, but the user is distracted and enters a prescription number instead, the pharmacy system can be expected to detect this input error and provide another audible prompt message that asks the user to try again. Thus, if the user makes a mistake at any point during entry of the prompted information, the phone's display will become further cluttered and confusing in that it will contain both the incorrectly-entered information and the subsequent attempt with corrected information. As more and more digits are added to the phone's display, the user may quickly lose track of what the numbers represent, and will not be able to look back into the string of digits for help in making decisions.

An embodiment of the present invention provides visual cues for the user, as the interaction with the automated phone system occurs. Thus, the user can quickly review the visual cues—for example, while making subsequent decisions for the interaction. These visual cues are referred to herein as "tooltips", and comprise graphical representations (such as icons) that are inserted into the number stream to provide a quick visual indication of the meaning of the digits entered by the user—including not only where the entered digits are delimited, but also what type of data they represent. In the pharmacy scenario discussed above, for example, the added tooltips give the user visual cues for distinguishing among the prescription number, the entered birth date, the number of refills requested, fields of the payment information, and so forth. The user can then visually scan back through the entered values, pick out the data that may be needed for making subsequent decisions, and implement those decisions. In addition to benefiting the end user, the disclosed techniques may also benefit the company with which the user is interacting because the user is now more likely to successfully perform complex and lengthy interactions with the company's automated phone system, without having to contact a customer support agent for assistance.

Figure 2:
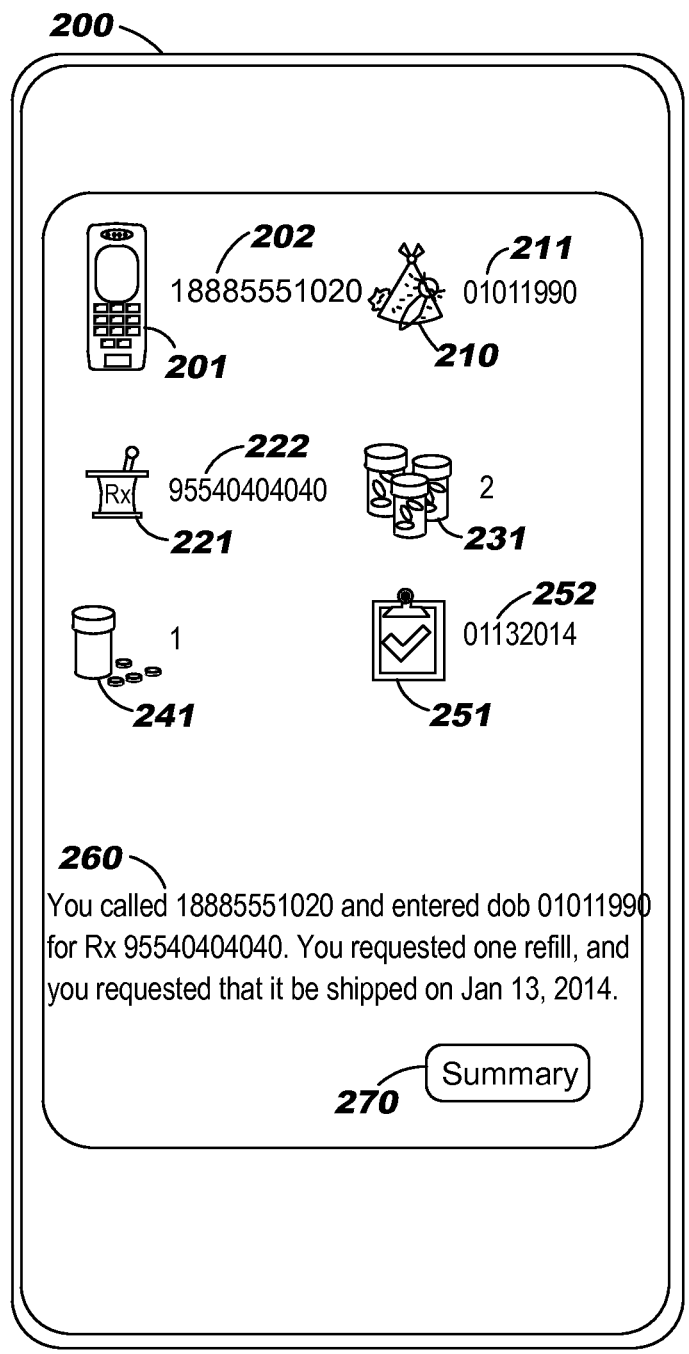
FIG. 2 depicts a phone display area with tooltips inserted into the data input stream to provide visual cues for the user according to an embodiment of the present invention.

A sample phone-based interaction in the prescription refill scenario will now be illustrated with reference to FIGS. 1 and 2. FIG. 1 represents the user's phone display area when using a conventional approach, while FIG. 2 depicts a phone display area with tooltips inserted into the data input stream to provide visual cues for the user according to an embodiment of the present invention.

Initially, the user retrieves his or her phone, and after detecting a dial tone, enters the phone number for the pharmacy. In the example, the entered phone number is "18885551020". When the call is connected, an automated message plays for the user, such as "Please enter your date of birth". In the example, the user enters "01011990". After confirming that this is a valid birth date, the automated phone system then asks "What is the prescription number you are calling about?". In the example, the user enters "95540404040". After verifying that a user with the entered birth date has a prescription with that number, the automated phone system may then give the user several choices that are selectable from a hierarchical menu, such as "Press 1 to speak to the pharmacist; press 2 for refill information; press 3 for dosage directions; press 4 to repeat these options.". Suppose that the user enters "2" for refill information. The automated phone system may then consult a database to determine how many refills are remaining for this prescription, and in the example, might inform the user that there are 3 refills remaining, followed by a message such as "Press 1 to refill now, or press 2 to return to the main menu.". Suppose that the user enters "1" to request a refill. The automated phone system may then provide a message such as "Your prescription will be available no sooner than Jan. 10, 2014. Please enter your preferred shipping date.". In the example, the user enters "01132014". The automated phone system then places an order for the refill, and may inform the user of an order confirmation number. While this scenario is relatively simple, more complex scenarios may be envisaged. For example, the user might want to check the refill status and/or order refills for several different prescriptions, compare pricing between generic and name brand products, check the status of the user's account in a rewards program provided by the pharmacy, and so forth. With each additional prompt message received from the automated phone system, the user enters at least one digit on the phone keypad, creating a corresponding string (i.e., concatenation) of digits.

The phone display 100 of FIG. 1 shows the string of digits that would be presented on the user's phone, for the sample interaction, by a conventional approach. As can be seen by inspection, even for this relatively simple example, it will be confusing and unwieldy for the user to pick out which digits correspond to which questions and answers if the user needs to review the already-entered information for any reason. In sharp contrast, the tooltips inserted into the phone display 200 of FIG. 2 according to an embodiment of the present invention give the user helpful visual cues for identifying the individual values within the data input stream. As can be seen in this illustration of display 200, and as further discussed below, a number of tooltips 201, 210, etc. have been inserted. (Note also that reference numbers 260, 270 are associated with graphic elements that are optional in an embodiment of the present invention, as further discussed below.)

Figure 3:
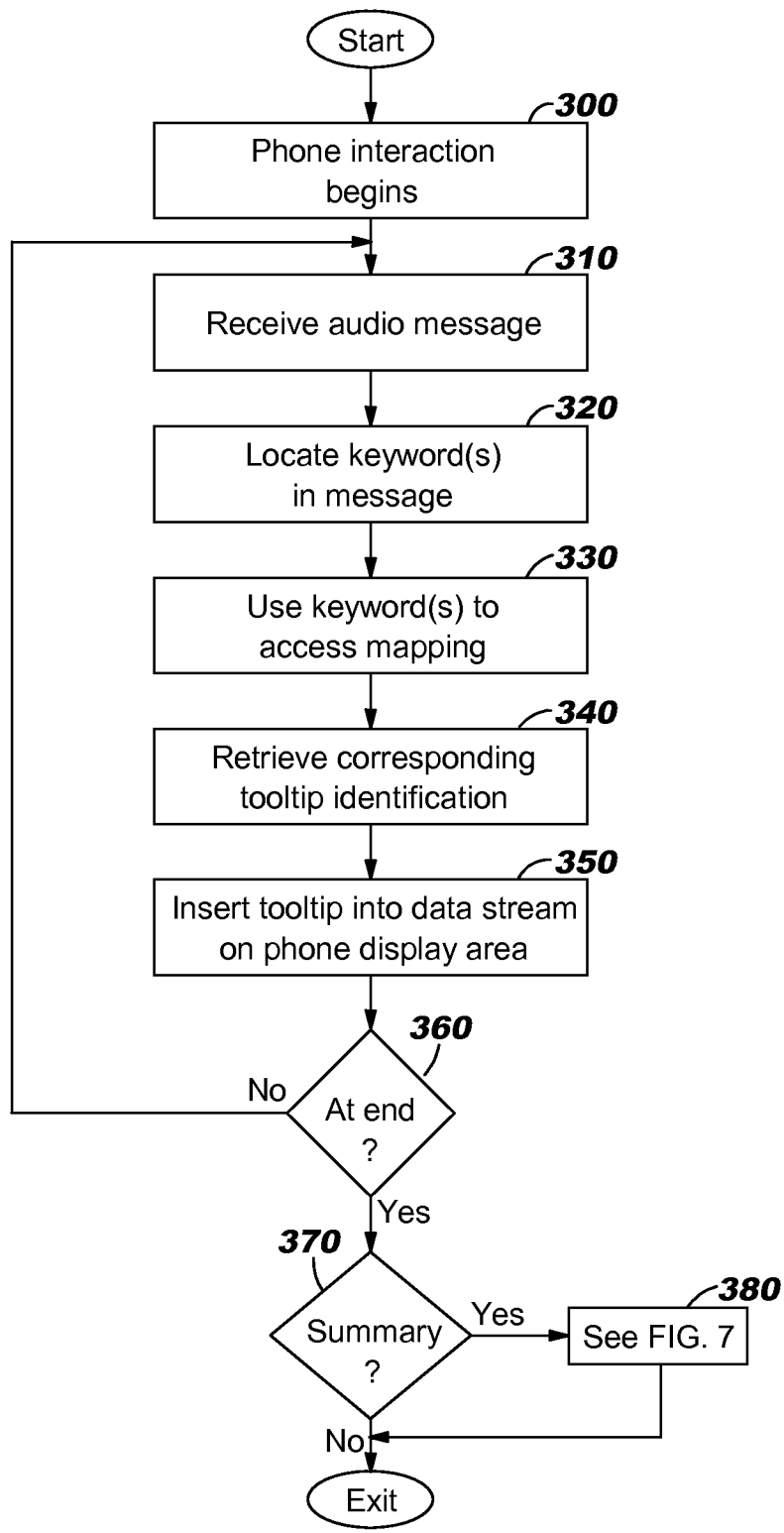
FIG. 3 provides a flowchart depicting logic which may be used when implementing an embodiment of the present invention.

Turning now to FIG. 3, a flowchart is provided depicting logic which may be used when implementing an embodiment of the present invention. This logic preferably operates on the user's phone, and is invoked when the user initiates an interaction with an automated phone system (Block 300). An audible prompt message is received from the automated phone system (Block 310). The audible message is then parsed to identify one or more relevant keywords of the message (Block 320). Techniques are known in the art for voice analysis of audible freeform messages for purposes of locating the words spoken therein, and for using contextual awareness and keyword identification to locate relevant keywords from among these words, and an embodiment of the present invention preferably leverages such known techniques. (As one example of known techniques for locating relevant keywords in freeform messages, Internet search engines are adapted for accepting entry of freeform text that represents a user's question, and locating a number of Web sites containing information that may be useful for answering the user's question. Notably, these search engines are adapted for filtering out the "noise" words from the freeform text while determining which words are the relevant terms or keywords.)

An embodiment of the present invention uses a mapping data structure that identifies tooltips that correspond to particular keywords that may appear in the audible prompt messages, and thus the located relevant keyword(s) of the message is/are used to access such data structure (Block 330) in order to retrieve an identification of the corresponding tooltip (Block 340). The tooltip is then inserted into the data stream on the user's phone display area (Block 350), after which a test is made (Block 360) to see if the phone-based interaction is at an end. If not, then the processing of FIG. 3 iterates by returning control to Block 310. On the other hand, when the test at Block 360 has a positive result, another test may optionally be made (Block 370) to determine whether a summary of the now-concluded interaction will be presented. This summary is an optional feature, and is discussed below with reference to FIG. 7. (Note that when the optional summary feature is not implemented, the test at Block 370 and the further processing represented by Block 380 are preferably omitted. Also, it should be noted that while the summary is described herein as being created when the interaction has concluded, this is by way of illustration and not of limitation.)

A sample mapping data structure 400 is illustrated in FIG. 4. In this example, a first column 410 contains keywords of interest, and a second column 420 contains a file name of the graphical image (e.g., icon) that will be used as the corresponding tooltip. A particular tooltip might be associated with more than one keyword—for example, to account for different ways in which an audible message might request a particular type of input data. This is shown in FIG. 4 by rows 401-403 of the sample data, where an icon with file name "birth.bmp" is associated with keywords "date of birth", "birth date", and "birthday", respectively. Thus, when Block 310 detects that the pharmacy system asked the user "Please enter your date of birth", Block 320 locates (in this example) the term "date of birth" and Blocks 330-340 then determine that the graphic image stored in file "birth.bmp" is to be inserted into the data stream by Block 350. See reference number 210 in FIG. 2, which presents one example of an icon that might be used to visually remind the user that the numeric value at reference number 211 is a birth date. Note also that Block 350 preferably inserts this tooltip 210 before the user enters the numeric value 211, and therefore, if the user is confused about what type of information is being requested or gets distracted while the audible prompt message is playing, the user can look to the tooltip 210 for guidance as to what type of input data is needed. (Discussions herein that refer to the tooltips as providing information for review by the user after entering some amount of input data are therefore by way of illustration but not of limitation, and such discussions should be interpreted as also including the case where the user reviews a tooltip in advance of entering the corresponding input data.)

The remaining rows of data structure 400 also correspond to the phone display 200 in the example of FIG. 2. Row 404 may be a special type of entry, identifying a tooltip 201 which is provided at the beginning of the data stream on the user's phone display (rather than in response to detecting a keyword in an audible message) to remind the user that the initial sequence of digits 202 is the phone number that the user dialed to begin the interaction with the automated phone system. Row 405 contains the keywords "prescription number", and identifies a tooltip 221 for reminding the user that the numeric value 222 is a prescription number. Row 406 identifies a tooltip 231 to remind the user that this is when the automated system asked " . . . press 2 for refill information . . . ", and row 407 identifies a tooltip 241 to remind the user that he or she chose "refill now" as an option from the audible selection menu. Finally, row 408 identifies a tooltip 251 that reminds the user that the number value 252 is a shipping date.

Figure 5:
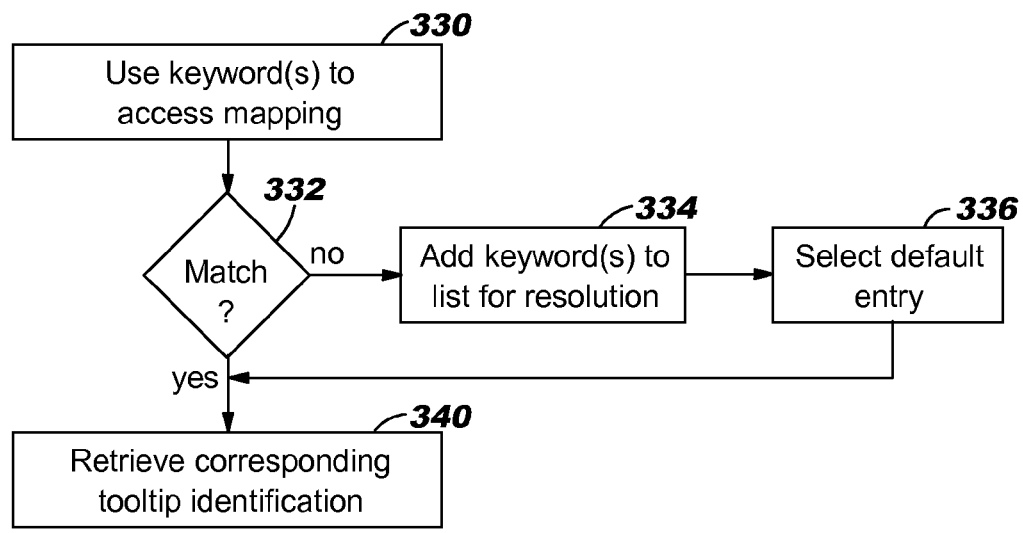
FIGS. 5-6 provide flowcharts depicting logic which may be used when implementing an optional feature that dynamically adds rows to the mapping data structure responsive to detecting keyword(s) that have no corresponding row in the existing data structure.
Figure 6:
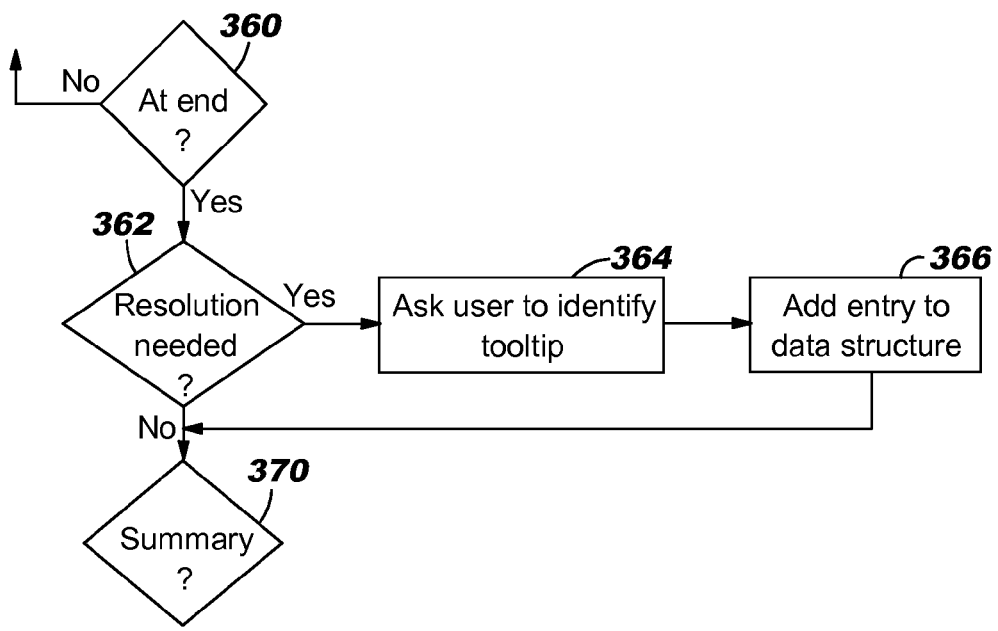

In a preferred embodiment, the data structure 400 is stored on the user's phone. An initial set of rows may be provided, and additional rows may be added dynamically. In one approach, rows are added when keyword(s) are detected that have no corresponding row in the existing data structure. Responsive to this detection, a row containing a default entry for a non-matched keyword (not shown in FIG. 4) may be located and a default tooltip identified therein may be inserted into the data stream on the user's phone display. When the interaction is finished, the user may be prompted by an embodiment of the present invention to identify a tooltip for each such non-matched keyword, and a corresponding row may then be generated and added to the data structure. See FIGS. 5 and 6, which depict logic that may be used (as extensions of the logic in FIG. 3) for this purpose. As shown in FIG. 5, after Block 330 accesses the mapping data structure 400, a test is made (Block 332) as to whether a match for the keyword(s) was found. If so, then processing continues as discussed earlier by transferring control to Block 340. When a match was not found, however, control transfers to Block 334, which adds the keyword(s) to a list for subsequent resolution. Block 336 then selects a default entry for a non-matched keyword, and Block 340 will then retrieve the corresponding tooltip identification. As shown in FIG. 6, after Block 360 detects that the interaction is concluded, an additional test (Block 362) tests whether resolution is needed. This test has a positive result if any keywords were added to a list by Block 334 of FIG. 5. Accordingly, for each such list entry, Block 364 preferably asks the user to identify the file name of a corresponding tooltip, and Block 366 formats a row containing the keyword(s) and tooltip file name and then adds that row to the mapping data structure. When resolution is finished, control transfers to Block 370 (if implemented; otherwise, control exits). Note that while iterative processing of Blocks 364-366 has not been shown in FIG. 6 for drafting convenience, it will be obvious to one of ordinary skill in the art how this iteration is to be provided to process multiple list entries. (Note also that delaying the resolution of non-matched keywords to the end of the phone-based interaction, rather than performing the resolution of each non-matched keyword in real time, is deemed to be preferable as it is less disruptive to the user. However, an embodiment that resolves non-matched keywords as they are detected is deemed to also be within the scope of the present invention.)

Figure 7:
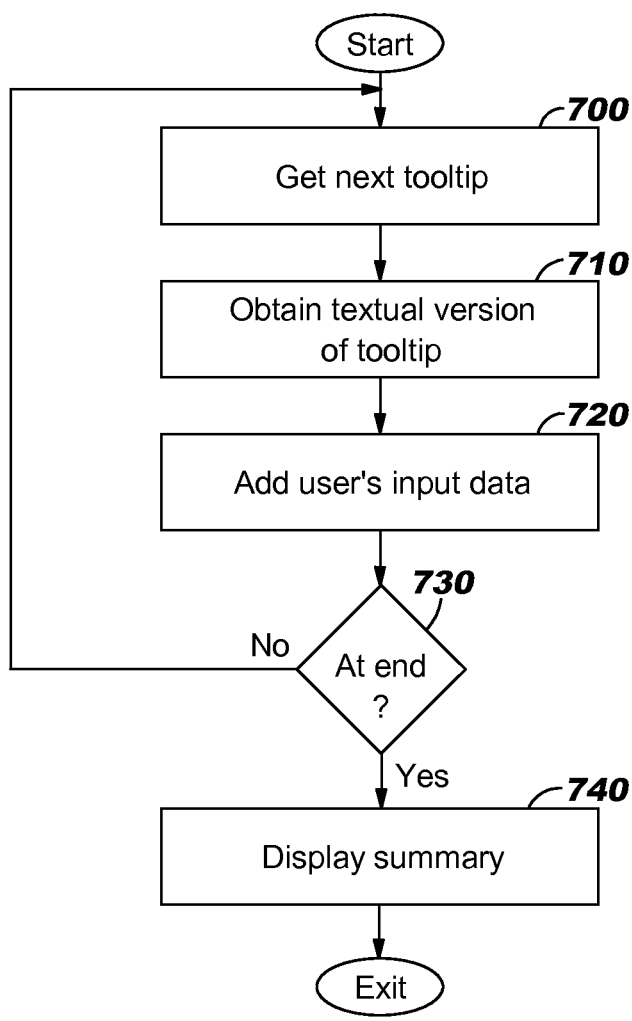
FIG. 7 provides a flowchart depicting logic which may be used when implementing an optional summary function which provides a summary of a user's interactions with an automated phone system.

FIG. 7 provides a flowchart depicting logic which may be used when implementing an optional summary function which, as noted earlier with reference to Block 370 of FIG. 3, provides a summary of the user's interactions. This summary preferably comprises a textual representation of the interaction, and is preferably generated responsive to a request from the user. For example, a graphical "Summary" button 270 is illustrated in FIG. 2, and reference number 260 identifies a textual representation of the sample interaction for refilling a prescription. Note that because the processing of FIG. 3 captures information about what information is being requested during the interaction (Blocks 310-340) in order to identify appropriate tooltips, this captured information is usable for representing text corresponding to the "questions" in the summary in addition to representing the "answers" (i.e., the user's responses), thus providing a benefit over known techniques which capture only the answers (as illustrated by FIG. 1). Note also that in the example summary 260, some information is presented in compact form (such as "dob" representing "date of birth" and "Rx" representing "prescription number") in view of the relatively limited amount of display space that is available in a phone display area, although this is by way of illustration and not of limitation.

The processing of FIG. 7 begins by getting the next tooltip (Block 700) of the interaction. Block 710 then obtains a textual version of that tooltip, and the user's input data is then added by Block 720. With reference to the example tooltip 210, the textual version in FIG. 2 is "dob", and the user's input data is "01011990". As another example, the textual version of tooltip 241 is "You requested [X] refill", where the value for [X] is filled in by Block 720. Block 730 tests whether processing of all tooltips and corresponding user's input data is at the end. If not, then control transfers back to Block 700 for processing the next tooltip. Otherwise (i.e., when the test at Block 730 has a positive result), the summary is displayed (Block 740) as a textual message such as that shown by reference number 260 in FIG. 2.

In another optional aspect, the summary may be filtered to suppress sensitive information. For example, if the user has entered a social security number or credit card number during the interaction, these numeric values may be identified as sensitive and rather than echo them back to the user in the summary, a predetermined pattern may be displayed instead. Only the last 4 digits of the entered value might be displayed, for example, or the entire value might be represented using special characters (such as "#") as a mask. When this filtering aspect is provided, the mapping data structure may be augmented with additional columns 430, 440 that contain an indicator (such as a Boolean value or flag) as to whether this is a sensitive value and if so, how that value should be displayed. In row 405, for example, a "yes" value in column 430 indicates that a prescription number is considered sensitive, and an entry "#XXX" in column 440 indicates that the last 3 digits of the prescription number are to be displayed in the clear while all preceding digits are to be displayed as the hash mark or pound sign "#".

Figure 8:
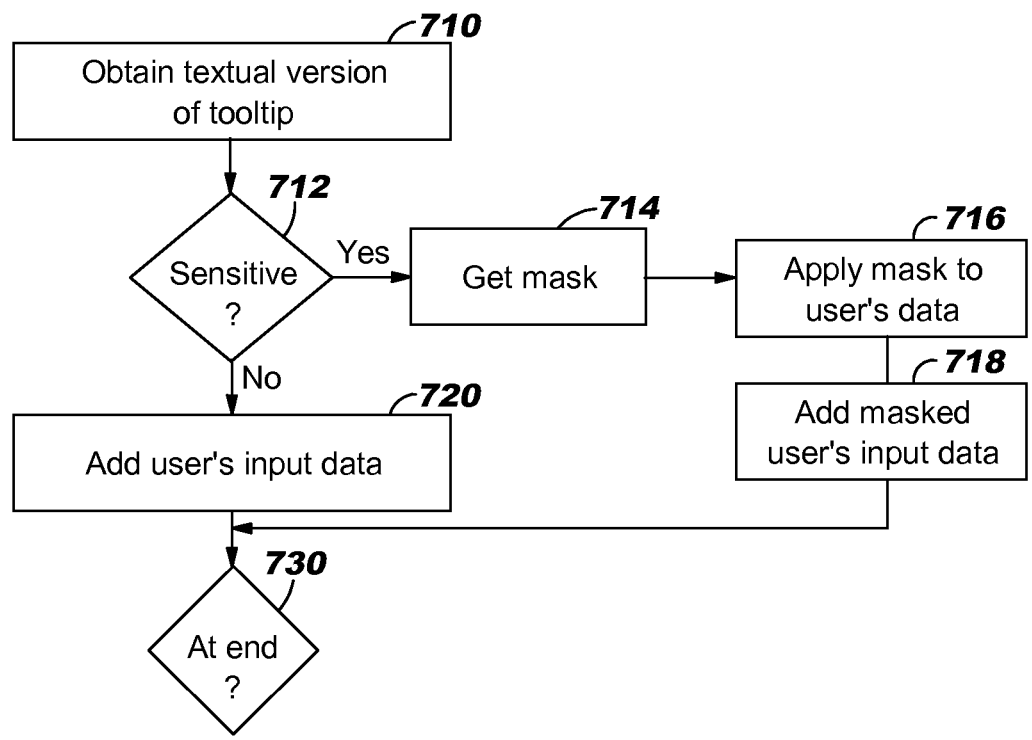
FIG. 8 provides a flowchart depicting logic that may be used when implementing an optional feature that filters the summary to suppress sensitive information, and FIG. 9 provides a flowchart depicting logic that may be used when implementing another optional feature that filters the summary to remove cyclic entries and/or data that corresponds to data input errors.

See FIG. 8, which provides a flowchart depicting logic that may be used (as an extension of the logic in FIG. 7) when implementing this optional filtering of the summary to suppress sensitive information. As shown in FIG. 8, after Block 710 obtains the textual version of the current tooltip, Block 712 tests whether this tooltip represents sensitive information (for example, using column 430 of FIG. 4). If not, then processing continues at Block 720 to add the user's input data to the summary without filtering thereof. When the test in Block 712 has a positive result, on the other hand, control transfers to Block 714 which obtains a mask (for example, using column 440 of FIG. 4) that will be used in displaying the sensitive data. Block 716 applies this mask to the data and the masked version of the user's input data is added (Block 718) to the summary, after which control transfers to Block 730.

Figure 9:
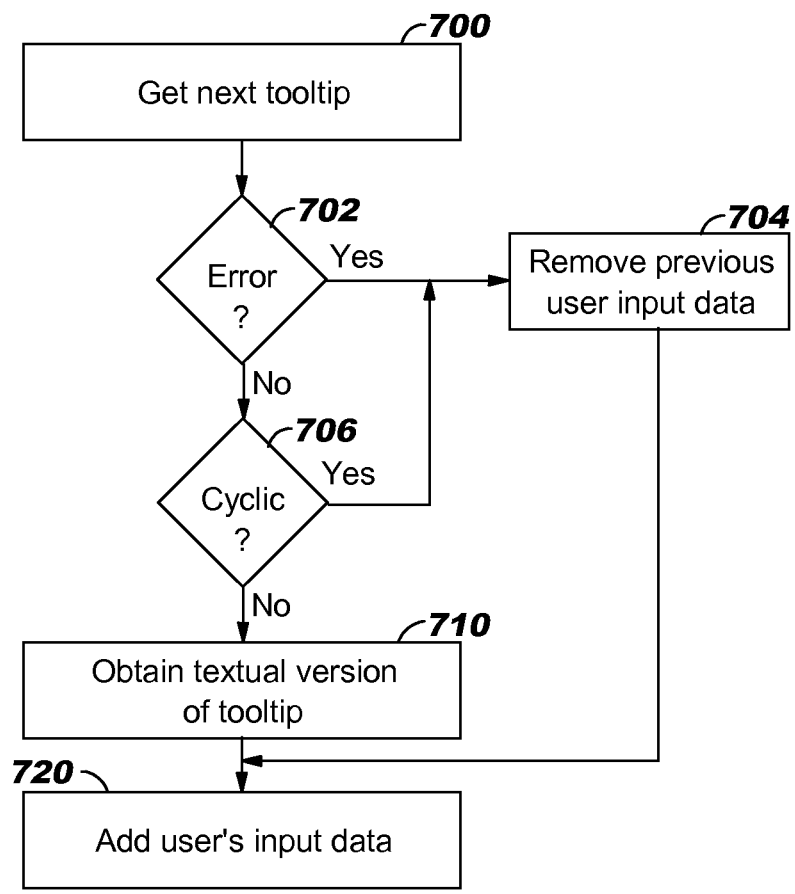

As noted earlier, users sometimes make mistakes when entering data during an interaction with an automated phone system. The user might make a mistake in the prescription number, for example. When this mistake is detected by the automated system, the user is typically prompted to try again, as was also noted earlier. In an optional aspect, an embodiment of the present invention may be adapted for filtering such mistakes in input—which are nevertheless present in the input data stream—such that they are suppressed from being displayed in the summary that is presented to the user after the interaction concludes (where this filtering may, for example, reduce the likelihood of confusion for the user or simply prevent displaying irrelevant information). FIG. 9 presents a flowchart depicting logic which may be used (as an extension of the logic in FIGS. 7 and/or 8) when implementing this optional filtering process. As shown therein, after Block 700 obtains the next tooltip to be processed, Block 702 tests whether this tooltip represents an error situation. For example, Block 320 may have detected keyword(s) indicating an error, such as by parsing a message "I did not recognize that input. Please try again." Or, if Block 702 does not detect an error-related tooltip, then the test at Block 706 may detect a cycle in the prompt messages and corresponding user input—that is, a question/response cycle caused by the user's mistake and then re-entry of information. In either case, the detected incorrect user's input data is to be suppressed from the summary (and if incorrect data is not detected, control reaches Block 710 as in the normal case). Note that the incorrect data, when detected by either Block 702 or Block 706, has already been added to the summary by a prior iteration of Blocks 710-720. Block 704 therefore removes the user's (incorrect) input data added previously by Block 720 from the summary which is being built according to the logic of FIG. 7. Control then transfers from Block 704 to Block 720, which causes the textual version of the error-related, or cyclical, tooltip to be passed over and therefore not reflected in the summary.

In yet another optional aspect, the user may be allowed to selectively enable and disable the insertion of tooltips. By way of example, a graphical button may be provided in the phone display area (not shown) that can be activated to toggle the tooltip insertion function on and off. The user may be allowed to select this toggling during, or prior to, an interaction, as desired.

As has been demonstrated, an embodiment of the present invention enables a user to make intelligent decisions from information in the data stream generated from the user's input during an interaction with an automated phone system, and may be especially helpful as the data stream becomes lengthy. An embodiment of the present invention may be provided on a mobile phone, or more generally, on any phone which is adapted to have a display area that displays numeric representations corresponding to the user's entries from the phone keypad.

While an embodiment of the present invention is discussed herein primarily with reference to an example of interacting with a pharmacy system, it will be obvious that this is by way of illustration and not of limitation. An embodiment of the present invention may be used with many other types of automated phone systems, including banking systems, credit card systems, stock trading systems, and so forth without deviating from the inventive concepts disclosed herein.

Figure 10:
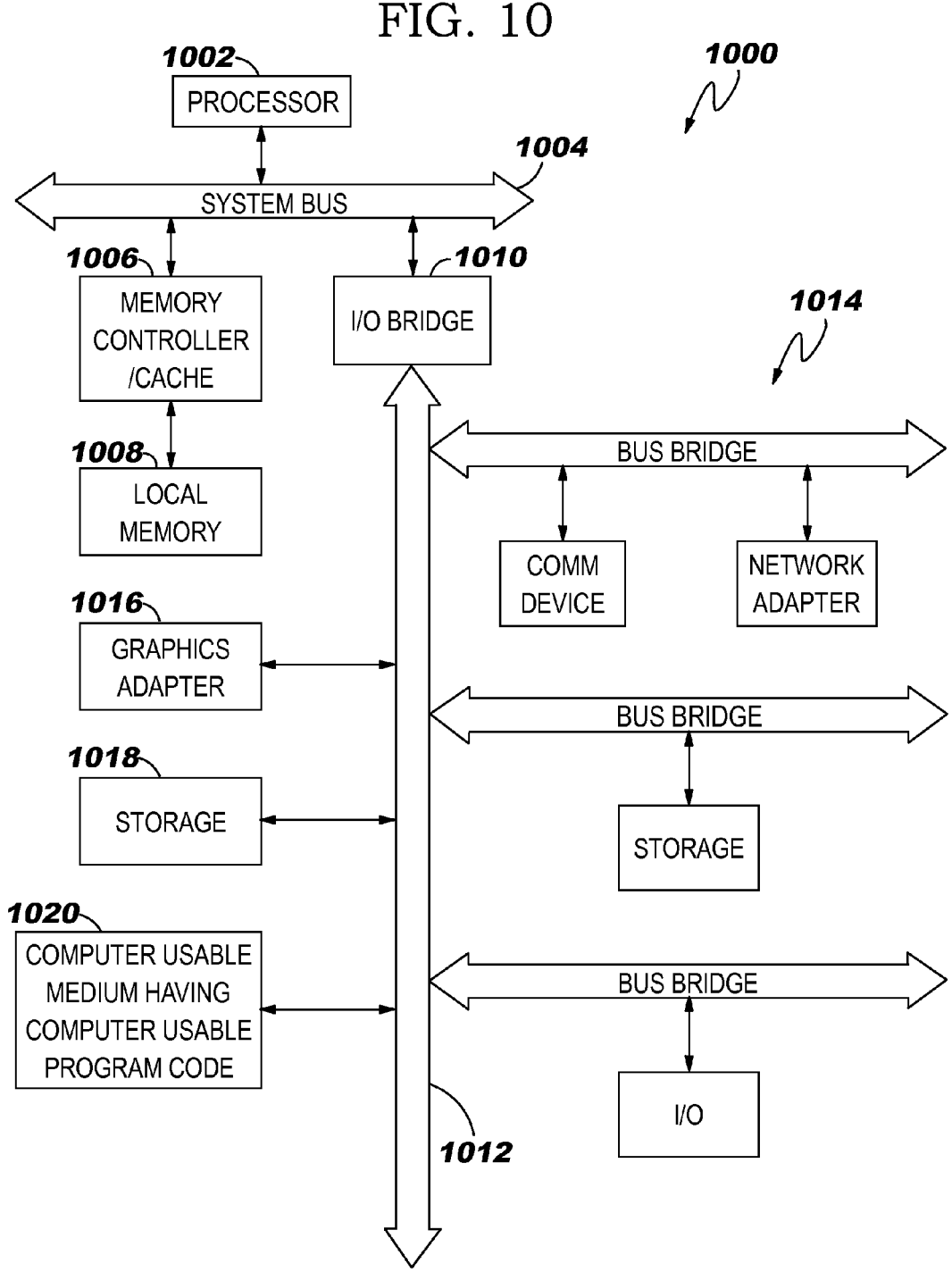
FIG. 10 depicts a block diagram of a data processing system in accordance with an embodiment of the present invention.

Referring now to FIG. 10, a block diagram of a data processing system is depicted in accordance with the present invention. Data processing system 1000 may comprise a processor 1002 connected to system bus 1004. Also connected to system bus 1004 is memory controller/cache 1006, which provides an interface to local memory 1008. An I/O bridge 1010 is connected to the system bus 1004 and provides an interface to an I/O bus 1012. The I/O bus may be utilized to support one or more buses 1014 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 1016, storage 1018, and a computer usable storage medium 1020 having computer usable program code embodied thereon. The computer usable program code may be executed to execute any aspect of the present invention, as have been described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
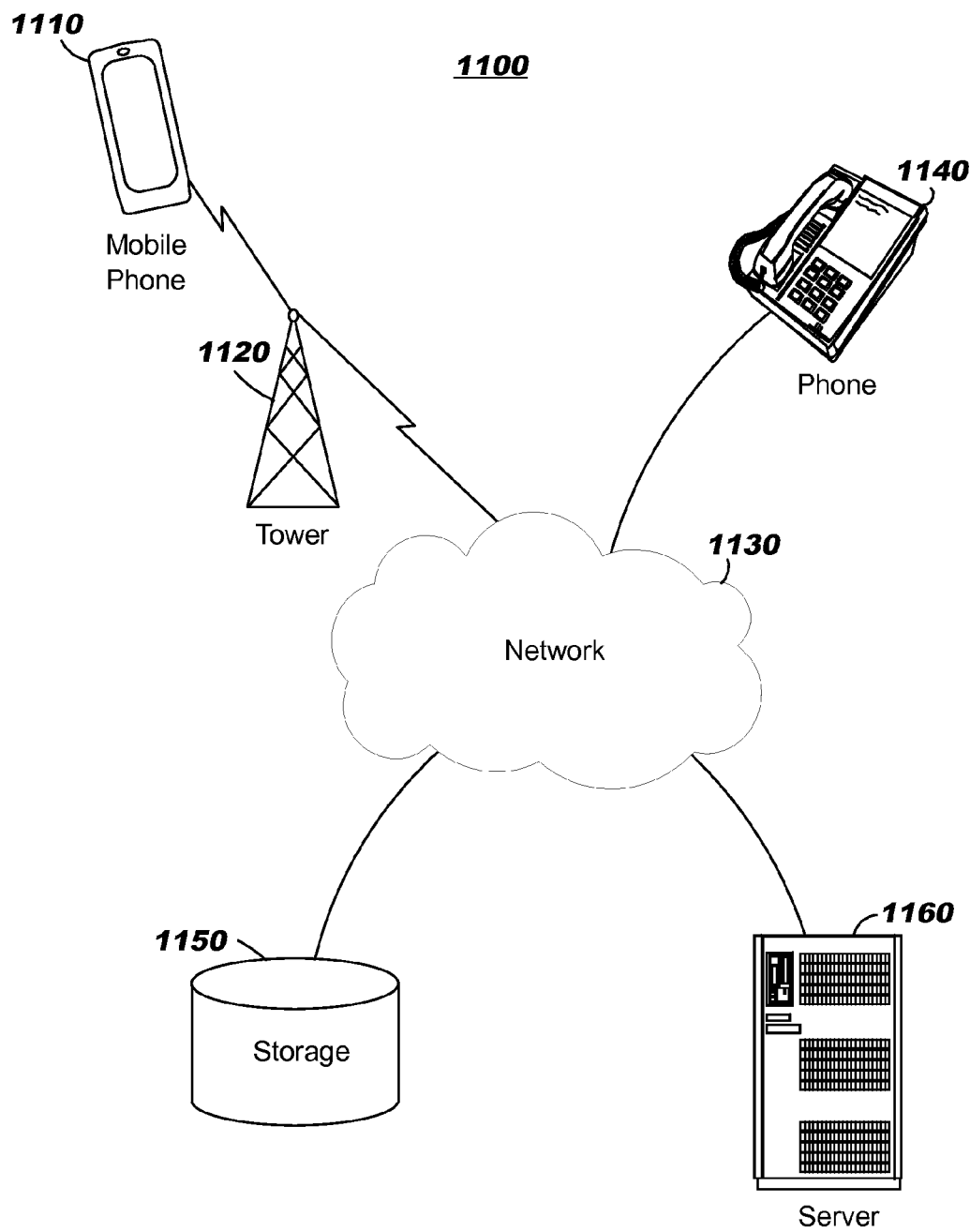
FIG. 11 depicts a simplified representation of a networking environment in which an embodiment of the present invention may operate.

FIG. 11 depicts a simplified representation of a networking environment 1100 in which an embodiment of the present invention may operate. The user's phone is depicted as a mobile phone 1110, by way of example, where this phone may connect through a cell tower 1120 to a network 1130. The user's phone might alternatively be a device 1140 which is adapted to have a display area that displays numeric representations corresponding to the user's entries from the phone keypad, and such phone device 1140 may connect to the network 1130 using conventional means. The automated phone system may be provided as a server 1160. Data storage 1150 may be provided as network-attached storage and/or as storage coupled to server 1160.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A telephone device comprising:
   a keypad usable for receiving responses from a user during a telephone-based interaction between the telephone device and an automated telephone system;
   a display area usable for displaying a data stream comprising a representation of the responses received from the user;
   a processor; and
   instructions which are executable, using the processor, to perform functions comprising:
      detecting receipt, at the telephone device, of an audible prompt message from the automated telephone system during the telephone-based interaction;
      locating, in the audible prompt message, at least one keyword;
      using the located at least one keyword to obtain an identification of a graphical image corresponding to the located at least one keyword;
      inserting the identified graphical image into the data stream displayed on the display area, in advance of receiving a response from the user to the audible prompt message, as a visual cue for the user;
      receiving, from the user through the keypad, the response to the audible prompt message; and
      displaying, in the data stream on the display area following the inserted graphical image, the representation of the response received from the user.

2. The telephone device according to claim 1, wherein the instructions are performed iteratively responsive to each of a plurality of audible prompt messages received from automated telephone system during the telephone-based interaction.

3. The telephone device according to claim 1, wherein locating the at least one keyword comprises using a voice analyzer to parse the audible prompt message for locating words therein and a context analyzer for selecting, from the located words, the at least one keyword.

4. The telephone device according to claim 1, wherein using the located at least one keyword to obtain the identification of the graphical image comprises using the located at least one keyword as an index into a mapping data structure that contains a plurality of entries, each entry comprising an index value and a corresponding graphical image identification, each of the index values comprising at least one keyword for matching against the index.

5. The telephone device according to claim 4, further comprising:
   providing, as the obtained identification of the graphical image responsive to failing to match the located at least one keyword to any of the plurality of index values, an identification of a default graphical image.

6. The telephone device according to claim 5, further comprising:
   dynamically adding an entry to the mapping data structure responsive to failing to match the located at least one keyword to any of the plurality of index values, the index value of the added entry comprising the located at least one keyword which fails to match any of the plurality of index values and the corresponding graphical image identification of the added entry being selected by the user in view of the added index value.

7. The telephone device according to claim 1, wherein the instructions are further executable to perform:
   generating a summary comprising a textual representation of each of a plurality of audible prompt messages received from automated telephone system during the telephone-based interaction and, for each of the plurality of audible prompt messages, the response received from the user; and
   displaying the summary on the display area separate from the displayed data stream.

8. The telephone device according to claim 7, wherein generating the summary further comprises:
   detecting, for the telephone-based interaction, each of at least one response received from the user that contains sensitive data; and
   filtering the sensitive data from the summary by suppressing at least a portion of the sensitive data from the textual representation.

9. The telephone device according to claim 8, wherein detecting the sensitive data further comprises determining that a sensitive data flag is associated with the at least one keyword which is located in the audible prompt message for which the user provides the sensitive data in the response thereto.

10. The telephone device according to claim 7, wherein generating the summary further comprises:
    detecting, for the telephone-based interaction, each of at least one response received from the user that contains incorrect or cyclic data; and
    filtering the incorrect or cyclic data from the summary by suppressing the incorrect or cyclic data from the textual representation and also suppressing, from the textual representation, text representing the graphical image inserted into the data stream responsive to receiving a subsequent audible prompt message requesting that the user provide a subsequent response to replace the incorrect or cyclic data.

11. The telephone device according to claim 1, wherein the telephone device is a mobile phone.

12. A method of providing visual cues for a user who is using a telephone device for a telephone-based interaction with an automated telephone system, the telephone device comprising a keypad usable for receiving responses from the user during the telephone-based interaction and a display area usable for displaying a data stream comprising a representation of the responses received from the user, comprising:
    detecting receipt, at the telephone device, of an audible prompt message from the automated telephone system during the telephone-based interaction;
    locating, in the audible prompt message, at least one keyword;

using the located at least one keyword to obtain an identification of a graphical image corresponding to the located at least one keyword;

inserting the identified graphical image into the data stream displayed on the display area, in advance of receiving a response from the user to the audible prompt message, as a visual cue for the user;

receiving, from the user through the keypad, the response to the audible prompt message; and displaying, in the data stream on the display area following the inserted graphical image, the representation of the response received from the user.

13. The method according to claim 12, wherein the visual cue provides a visual indication of a meaning of digits provided by the user as the response to the audible prompt message.

14. The method according to claim 12, wherein the detecting receipt, the locating, the using, the inserting, the receiving, and the displaying are performed iteratively responsive to each of a plurality of audible prompt messages received from automated telephone system during the telephone-based interaction.

15. The method according to claim 12, wherein locating the at least one keyword comprises using a voice analyzer to parse the audible prompt message for locating words therein and a context analyzer for selecting, from the located words, the at least one keyword.

16. The method according to claim 12, wherein using the located at least one keyword to obtain the identification of the graphical image comprises using the located at least one keyword as an index into a mapping data structure that contains a plurality of entries, each entry comprising an index value and a corresponding graphical image identification, each of the index values comprising at least one keyword.

17. A computer program product for providing visual cues for a user who is using a telephone device for a telephone-based interaction with an automated telephone system, the computer program product comprising:

a computer-readable storage medium having computer readable program code embodied therein, the computer-readable program code configured for:

detecting receipt, at the telephone device, of an audible prompt message from the automated telephone system during the telephone-based interaction;

locating, in the audible prompt message, at least one keyword;

using the located at least one keyword to obtain an identification of a graphical image corresponding to the located at least one keyword;

inserting the identified graphical image into the data stream displayed on the display area, in advance of receiving a response from the user to the audible prompt message, as a visual cue for the user;

receiving, from the user through a keypad of the telephone device, the response to the audible prompt message; and displaying, in the data stream on a display area of the telephone device, the representation of the response received from the user.

18. The computer program product according to claim 17, wherein the computer-readable program code is configured for iteratively performing the detecting receipt, the locating, the using, the inserting, the receiving, and the displaying responsive to each of a plurality of audible prompt messages received from automated telephone system during the telephone-based interaction.

19. The computer program product according to claim 17, wherein locating the at least one keyword comprises using a voice analyzer to parse the audible prompt message for locating words therein and a context analyzer for selecting, from the located words, the at least one keyword.

20. The computer program product according to claim 17, wherein using the located at least one keyword to obtain the identification of the graphical image comprises using the located at least one keyword as an index into a mapping data structure that contains a plurality of entries, each entry comprising an index value and a corresponding graphical image identification, each of the index values comprising at least one keyword.

* * * * *